United States Patent [19]

Schneider

[11] Patent Number: 4,763,927
[45] Date of Patent: Aug. 16, 1988

[54] SECURITY DOCUMENT

[75] Inventor: Walter Schneider, Miesbach, Fed. Rep. of Germany

[73] Assignee: GAO Gesellschaft fur Automation und Organisation mbH., Fed. Rep. of Germany

[21] Appl. No.: 742,397

[22] Filed: Jun. 7, 1985

[51] Int. Cl.⁴ .................. G09C 3/00; G09C 5/00; B42D 15/00; B05D 7/00
[52] U.S. Cl. .................................... 283/70; 283/74; 283/83; 428/212
[58] Field of Search ................. 283/70, 74, 83; 427/7; 428/916, 212; 340/825.34

[56] References Cited

U.S. PATENT DOCUMENTS

| | | | |
|---|---|---|---|
| 3,571,957 | 3/1971 | Cumming | 283/70 |
| 4,223,918 | 9/1980 | Smoczynski | 283/83 |
| 4,226,904 | 10/1980 | Ollivier et al. | 428/212 |
| 4,230,344 | 10/1980 | Bell, Jr. et al. | 283/83 |
| 4,290,630 | 9/1981 | Lee | 283/83 |
| 4,379,471 | 4/1983 | Smith et al. | 250/342 |
| 4,434,549 | 3/1984 | Smith et al. | 29/832 |
| 4,455,039 | 6/1984 | Weitzen et al. | 283/83 |
| 4,522,428 | 6/1985 | Small et al. | 283/83 |
| 4,544,836 | 10/1985 | Galvin et al. | 283/74 |
| 4,609,207 | 9/1986 | Muck et al. | 283/74 |

FOREIGN PATENT DOCUMENTS 2754267  6/1978  Fed. Rep. of Germany ........ 283/83

Primary Examiner—E. R. Kazenske
Assistant Examiner—Paul M. Heyrana, Sr.
Attorney, Agent, or Firm—Bacon & Thomas

[57] ABSTRACT

In order to increase the protection against forgery of a security paper, a security inlay made of polymer material having piezoelectric and/or pyroelectric properties is embedded in the security paper. The presence of such an inlay can be tested by means of contacting and non-contacting measuring methods.

11 Claims, 2 Drawing Sheets

SECURITY DOCUMENT

BACKGROUND OF THE INVENTION

1. Field of the Invention

The present invention relates to a security document, in particular a security paper, bank-note, identification card, etc., having a feature which is embedded, for example in the form of a safety thread, in the interior of the document and capable of being tested mechanically in order to recognize the authenticity of the document.

2. Description of Related Art

It is known to protect security papers and other moneyvalue products made of paper or synthetic material against unauthorized imitation by embedding so-called safety threads therein. These safety threads generally consist of narrow strips of a synthetic or metal film, textile threads, wires and similar materials.

It is also known (e.g. German Offenlegungsschrift No. 14 46 851) to equip safety threads additionally with special properties by printing very fine letters (so-called micro-letters which are approx. 0.4 mm high) on them, for example, which make it especially difficult for a forger to imitate them. Coatings made of colored materials across the surface are also known in this connection.

In the course of the increasing automation, there have also been efforts to design the safety threads in such a way that they are suitable for mechanical testing. Thus, safety threads are provided, for example, with substances which fluoresce under UV light or have magnetic or special properties detectable using X-rays (see German Offenlegungsschrift No. 27 54 267, for example). The embedding of such threads in bank-notes or other security documents then offers the possibility of ascertaining the authenticity or the value of a document using appropriate testing devices.

The mechanical testing of security documents such as identification cards, bank-notes, etc., is desirable nowadays above all for money-issuing machines, so-called POS terminals or at bank counters. Rapid and mechanical testing of documents, for example with respect to their authenticity or their value, is also particularly useful and helpful, however, for the automatic sorting or processing of bank-notes or similar money-value products.

BRIEF SUMMARY OF THE INVENTION

The invention is based on the problem of proposing a feature suitable for security documents, for example in the form of a safety thread, which is capable of being tested mechanically in many different ways.

The films used according to the invention which are known per se and have piezoelectric and/or pyroelectric properties are provided on each side with an electrically conductive coating. Due to their piezoelectric property, a potential difference comes about between the conductive coatings in the case of mechanical deformation. If electrical voltage is applied to the conductive coatings, on the other hand, this causes the film to be deformed. Many of the known piezofilms have not only piezoelectric properties but also pyroelectric properties, i.e. a potential difference can also be measured between the conductive coatings when the film is heated.

The films are flexible and can be manufactured in thicknesses of 10 to 50 $\mu$m. They can be cut into threads of the desired width which are then excellently suited, due to these good mechanical properties, for being embedded in bank-notes, identification cards or other security documents.

The idea on which the invention is based, i.e. to embed films having piezoelectric and/or pyroelectric properties in the form of safety threads in documents such as banknotes, identification cards or other money-value products, offers a particularly wide assortment of testing possibilities. The great variety of these possibilities means that a kind of testing can be used which is particularly well-suited to the area automated in any specific case in order to detect the special properties of the inventive feature.

Thus, it is possible to measure and evaluate piezoelectric voltage which comes about due to mechanical deformation of the safety thread. For this purpose, the security document may be bent in the direction of the safety thread or subjected to brief mechanical jolts. The resulting d.c. or a.c. voltage can then be picked up in a contacting or non-contacting (e.g. capacitive) manner via the conductive coatings located on the film which serve as electrodes.

Further, the pyroelectric properties can also be used for mechanical testing. In this case it is necessary to first heat the zone of the document containing the safety thread. This is done expediently by irradiating infrared light of a suitable wavelength. Microwaves are also a suitable means for heating the threads since they are absorbed well by the film material.

These methods, which are based on mechano-electric or thermoelectric transformation, are suitable, for example, for testing identification cards or bank-notes in money-issuing machines or vending machines since the testing is stationary in this case, i.e. the security documents do not move during the testing. The mechanical and electrical components necessary for testing can be housed in relatively small housings so that the testing can also be carried out using simple hand-operated devices which may then be used, for example, at bank counters or the places of sale in department stores, etc.

Rapid non-contacting testing is advantageous in the case of automatic sorting or voucher-processing equipment since the documents are processed at high speed. In this case it is possible, for example, to utilize the sensitivity of the piezofilm to an ultrasonic field in order to test the safety thread as to its piezoelectric properties. The deformation of the piezofilm caused by an ultrasonic field creates a.c. voltage which can be picked up in a noncontacting manner from the conductive coatings of the film via appropriately arranged capacitor plates. It is also possible to transmit a.c. voltage to the conductive coatings of the piezofilm via the capacitor plates. The piezofilm is thereby set oscillating and emits sound waves of equal frequency which are detected via appropriate detectors, e.g. microphones.

In addition to the stated methods, which utilize for testing the effects resulting from piezoelectric and pyroelectric properties following mechanical, thermal or electrical excitation, it is also possible to test further physical properties of the inventive feature, such as the conductivity of its conductive coating or its optical transparency. If a plurality of properties are included in the authenticity testing and the individual results weighted at the same time, the reliability of recognition can be increased, on the one hand, and the efforts required by a forger to imitate the documents can even be increased many times over, on the other hand.

Further advantages and developments of the invention can be found in the subclaims and in the embodiments which are explained in more detail in the following with reference to the drawing.

BRIEF DESCRIPTION OF THE DRAWINGS

The figures show:

FIG. 1 shows a security paper 1 having a printed picture 2. A safety thread 3 is embedded in the interior of the security paper. This safety thread consists of a polymer film cut into strips and having piezoelectric and/or pyroelectric properties. The embedding of the safety thread in the security paper, for example a banknote, takes place during the manufacture of the banknote according to methods known in security paper technology. In the case of identification cards, which are generally composed of a plurality of synthetic layers, the safety thread is inserted between two of these layers which are then joined together across their entire surface by a cold or hot laminating process. Care must be taken in the case of the hot laminating process that the physical properties of the inserted safety thread are not impaired by temperatures which are too high. The safety thread embedded in a security paper or an identification card in this manner does not offer an observer any special features, when checked visually, since threads having the same or a similar appearance are well-known in bank-notes.

FIG. 2 shows a cross-section of a security pape 1 having. a safety thread 3 embedded between paper layers 5 and 6. The thickness relations are not shown true to scale in the interests of clear illustration.

Figure 1:
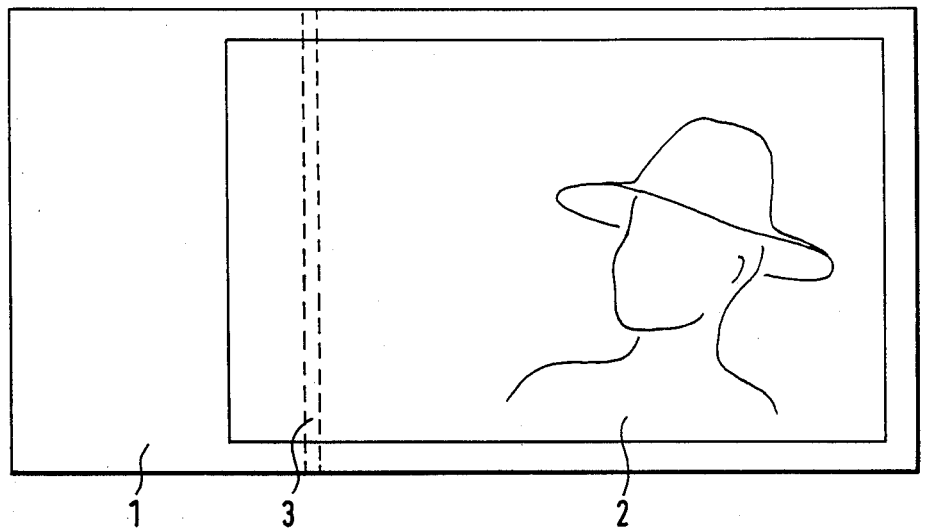
FIG. 1 shows a security document from the top embodiying the invention
Figure 2:
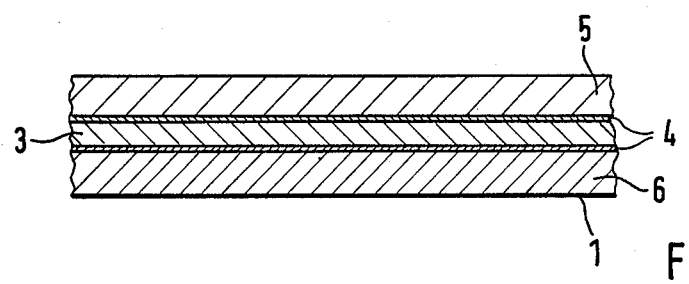
FIG. 2 shows the security document in cross-section.

The safety thread has a thickness of 10 to 50 μm, preferably 15 to 30 μm. The sheet thickness of the security paper is approx. 100 μm. The width of such safety threads is usually 0.4 to 1.5 mm, values ranging from 0.6 to 1.0 mm being used preferably. The film material is provided on each side with conductive coatings (metallization) 4 in order to apply electrical charges to the material or remove them therefrom. Conductive coatings 4 may be applied to the film so as to cover its entire surface or in an interrupted form by vacuum deposit, lamination or other appropriate methods. It is also possible to vacuum deposit transparent semiconductive metal oxides. Safety threads produced in this manner then remain transparent and can only be detected with difficulty, or in some cases not at all, in the paper or any other moneyvalue means of payment.

A film material having piezoelectric and pyroelectric properties suitable for the inventive application is, for example, polyvinylidene fluoride (PVDF). It exhibits the greatest piezoelectric and pyroelectric coefficients of all substances known up to now. PVDF crystallizes in three different phases $\alpha$, $\beta$ and $\gamma$. The general $\alpha$ phase, in which the substance crystallizes out of the melt during cooling, has a non-polar character so that no piezoelectric properties arise here. Via mechanical deformation of the film, during which it is orientated in one or two directions, thereby orientating the polymer chains, the substance is transformed into the $\beta$ phase. For polarization, the film material is coated on each side with electrically conductive material. The film thus provided with conductive coatings is then subjected to an electrical field of approx. 1 MV/cm, heated to 80°–120° C. and cooled while maintaining the field. Polarization is "frozen" by this process and the film then exhibits the desired piezoelectric and pyroelectric properties.

The pieces of film mentioned above, which are provided in security documents, for example, in the form of threads, can be tested using a great variety of methods. Thus, it is possible to convert mechanical energy acting on the thread in the form of mechanical tension, jolts or vibrations into electrical energy inside the safety thread. This can be picked up from the thread as d.c. voltage in the case of bending, as an electrical voltage pulse in the case of jolts, as a.c. voltage of equal frequency in the case of vibrations. A contacting method can be selected to pick up the voltage.

In order to facilitate direct contacting, the safety thread may be embedded in such a way that an area sufficient for contacting is freely accessible on the safety thread. The safety thread should be embedded for this purpose according to known methods in such a way that contacting on each side is possible for each individual copy produced from a paper web.

Multilayer identification cards offer the possibility of leading the ends of the safety thread out onto the surface of the laminate. A further possibility is, for example, to provide the cover layers overlying the safety thread with appropriate windows which either remain free or are filled with electrically conductive material. In the latter case the card shows an uninterrupted smooth surface in order to prevent the windows from possibly being soiled.

Figure 3:
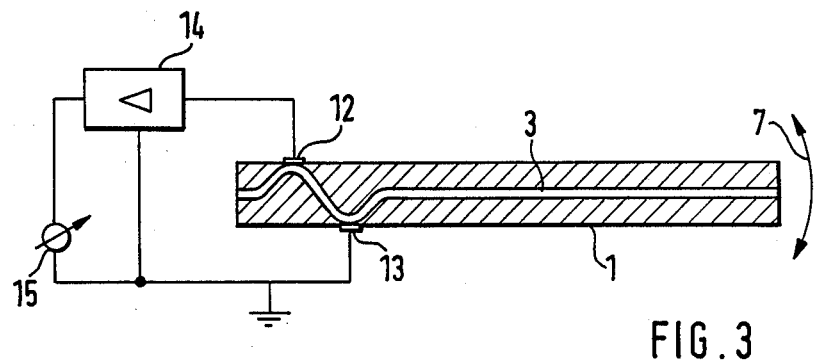
FIG. 3 shows a schematic view of a testing device of the security document.

FIG. 3 shows schematically a testing device for measuring a piezoelectric voltage caused by mechanical bending of the thread. For this purpose, electrodes 12, 13 are placed on conductive coatings 4 of safety thread 3. The electrodes are connected to a measuring device 15, for example via a charge amplifier 14. Via a bending device not shown in the figure, the strip is bent once or several times, for example in the direction of arrow 7. The piezoelectric voltage caused by the mechanical deformation of the thread can be displayed by aid of the measuring device.

Relatively high voltages can be obtained using so-called bimorphous films. These films are composed of two superjacent, uniaxially orientated piezofilms whose directions of polarization are opposite. The voltages V obtainable can be calculated according to the following formula:

$$V = \frac{3 \cdot g_{31} \cdot Y \cdot t^2 \cdot S}{16 \cdot L^2}$$

V = voltage
$g_{31}$ = piezoelectric elongation constant
Y = Young's modulus
t = thickness of the film
L = length of the film
S = deflection of the free end Using a PVDF film (polyvinylidene fluoride) for which $g_{31} = 0.17$ Vm/N; $y = 2.7 \cdot 10$ N/m², the thickness is 30 μm and the length is 70 mm, voltages of approx. 4 V result when the free end is deflected by 3 cm.

The measuring arrangement shown in FIG. 3 can also be used to evaluate the pyroelectric effect. In this case the film is heated instead of being mechanically deformed. The heat sources used may be IR or microwave emitters, for example. The pyroelectric voltages obtainable are proportional to the temperature change of the film strip and may be calculated according to the following formula:

$$V = \frac{p \cdot t \cdot \Delta T}{\epsilon}$$

v = voltage
p = pyroelectric coefficient
t = thickness
$\Delta T$ = temperature change
$\epsilon$ = dielectric constant Using PVDF films ($\epsilon = 15$, p = $-40$ $\mu$C/m K) having a thickness of 10 $\mu$m, a temperature change of 1° C. results in a pyroelectric voltage of approx. 3.5 V. The metal coating of the film may be designed accordingly to increase the absorption of the incident radiation. Appropriate coating materials are, for example, blackened gold or bismuth layers, which are characterized by a high wide-band absorptive response and by their good electrical conductivity.

On the other hand, it is also possible to provide the piezofilm on one side with a thin transparent or semi-transparent conductive coating. In this case the incident radiation penetrates the polymer material, a quick change of temperature being obtainable exploiting the strong absorption of the polymer material (PVDF) in the wavelength range of 8 to 11 $\mu$m. The metal coating on the opposite side of the film should then be a layer which reflects well so that the transmitted portion of the radiation is reflected into the material again.

In addition to the contacting measurement of a piezoelectric or pyroelectric voltage between the conductive coatings of polymer films, it is also possible to evaluate the charges or voltages in a non-contacting, e.g. capacitive, manner.

Figure 4:
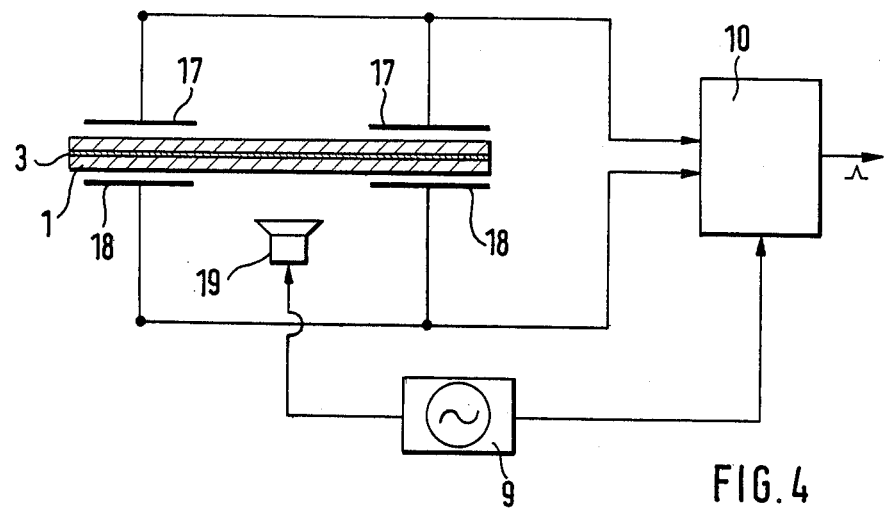
Figs. 4 and 5 show schematic views of further testing devices for the security document.
Figure 5:
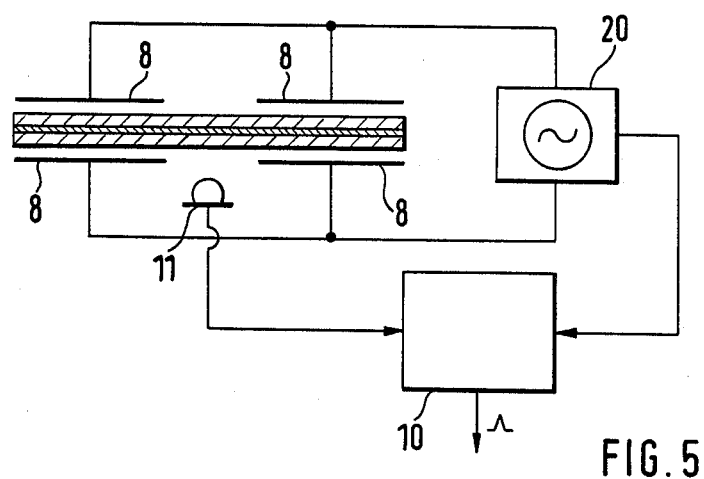

A further possibility consists in having sound energy act on the thread, as shown in FIG. 4, by aid of a transmitter 19 controlled by a generator 9. In this case an a.c. voltage analogous to the sound frequency comes about on the safety thread, which may be used for identification. It proves to be particularly advantageous to have sound frequencies in the ultrasonic range, i.e. having a frequency of approx. 40 to 400 kHz, act upon the safety thread. The resulting high-frequency a.c. voltages can be coupled out of the thread material effectively in a non-contacting manner. For this purpose, two or more series-connected capacitor plates 17, 18 are placed in an appropriate manner along safety thread 3 so that the latter is subjected to the high-frequency a.c. voltage due to the resulting electrical influence. It appears to be expedient to interconnect the capacitors with an inductance coil or an ohmic resistor in order to obtain a resonant circuit which may be tuned to the frequency of the transmitter.

The transmitter and receiver signals may be processed via a correlation element 10 in such a way as to eliminate or suppress external or spurious portions when the received measuring signals are being evaluated. Since a large portion of the sound waves are reflected by the surface of the paper, it is possibly to place the ultrasonic source directly on the surface of the paper, thereby avoiding the lossy air-paper transition.

In contrast to the method just described, it is also possible to have electrical voltages or electrical a.c. fields act upon the thread material. The necessary electrical voltages are generated by means of a generator 20 and directly applied to or coupled into the conductive coatings of the piezofilm. In the latter case capacitor plates 8 are arranged along the safety thread or the security paper is directed between two capacitor plates 8. When the safety thread passes through the electrical a.c. field built up between the capacitor plates, the safety thread is deformed periodically and stimulated to emit sound frequencies. It is useful to have an electrical a.c. voltage of 50 kHz, for example, act upon the safety thread made of piezoelectric material which then emits a sound wave of equal frequency. Detectors 11 constructed according to the principle of a microphone are then suitable for discovering the emitted sound frequencies. Depending on the dimensions of the safety thread, higher harmonics of the irradiated frequency will also come about which are thus dependent on the dimensions of the thread and allow for it to be identified.

Analogously to the testing method described above, the excitation signal and the measuring signal may be correlated in an appropriate correlation element 10 for evaluation, excluding external or spurious influences.

The piezovoltage generated by an ultrasonic field may further also be used for generating a magnetic a.c. field. The electrodes of the piezofilm are connected to an armature loop. The armature loop, which may also consist, for example, of several concentrically arranged loops, is provided, for example, on one side of the piezofilm by selectively coating the film with electrically conductive material. The electromagnetic field which comes about under the effect of an ultrasonic field can then be detected, for example when passing through appropriately arranged Helmholtz coils. This testing method thus also allows for quick and non-contacting testing.

The measuring results of the piezoelectric or pyroelectric properties may be combined during evaluation with other measuring results, such as the result of measuring the conductivity of the film coating or with results of testing the optical properties of the film (transparency in various spectral ranges).

Linking different individual results, possibly weighting them at the same time, increases the efforts required to imitate the feature since the film must in this case fulfill several conditions simultaneously.

I claim:

1. A security document including an embedded element which exhibits a mechanically testable physical property which is used to recognize the authenticity of the document, said element comprising a piece of film (3) comprising a polymer synthetic material having piezoelectric properties.

2. The security document according to claim 1, wherein said piece of film (3) comprises electrically conductive coatings (4) on each side.

3. The security document according to claim 2, wherein the polymer material of the piece of film (3) is polyvinylidene fluoride (PVDF).

4. The security document according to claim 2, wherein the piece of film (3) is embedded in such a way that the conductive coatings (4) lie partly on the surface on the document (1).

5. The security document according to claim 2, wherein the conductive coating (4) is blackened on at least one side.

6. The security document according to claim 2, wherein the conductive coating (4) is a transparent semiconductor layer on one side of the piece of film (3).

7. The security document according to claim 6, wherein the conductive coating (4) on the opposite side of the piece of film (3) has reflecting properties.

8. The security document according to claim 6, wherein the conductive coatings (4) are transparent semiconductor layers on each side.

9. The security document according to claim 1, wherein the piece of film (3) has a thickness of 10 to 50 µm, preferably 15 to 30 µm.

10. The security document according to claim 1, wherein the document includes synthetic layers and the piece of film (3) is embedded between said synthetic layers; and including windows in part of the area of the piece of film in said synthetic layers.

11. A security document according to claim 1, wherein said polymer synthetic material also has pyroelectric properties.

* * * * *